Figure 1:
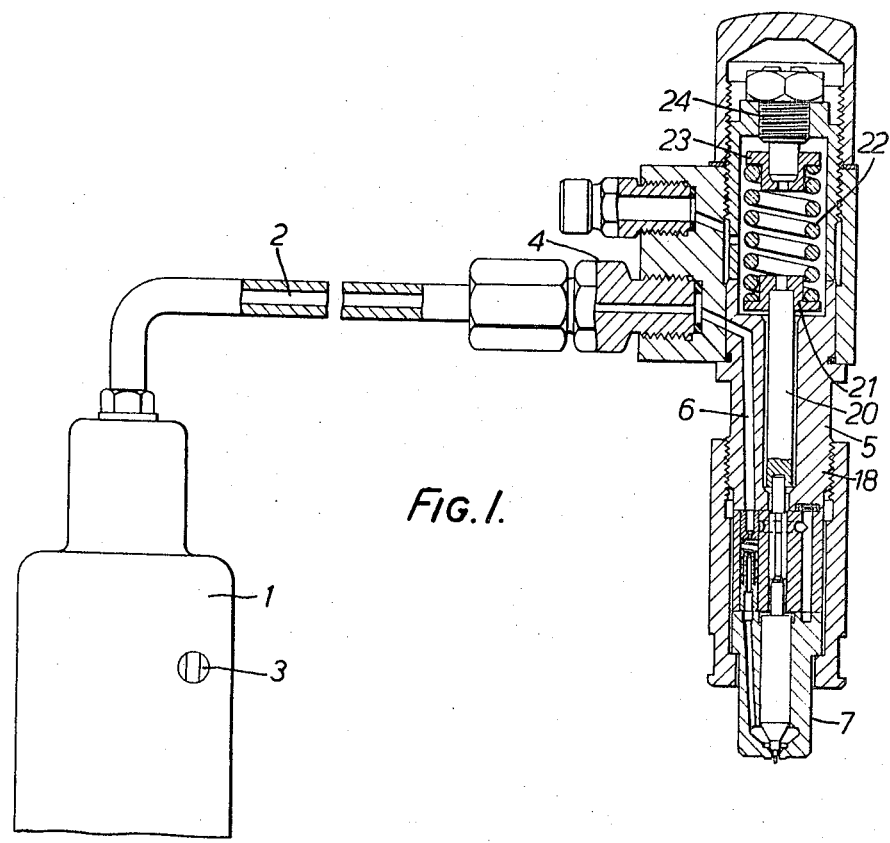

Sept. 19, 1967    B. W. MILLINGTON ETAL    3,342,422
FUEL INJECTION APPARATUS FOR INTERNAL COMBUSTION ENGINES
Filed Oct. 22, 1965    2 Sheets-Sheet 1

INVENTORS
BRIAN W. MILLINGTON
ROYSTON G. FREESE
WILLIAM M. SCOTT
BY
Watson, Cole, Grindle + Watson
ATTORNEYS

United States Patent Office 3,342,422
Patented Sept. 19, 1967

3,342,422
FUEL INJECTION APPARATUS FOR INTERNAL COMBUSTION ENGINES
Brian Wyatt Millington, Worthing, William Murray Scott, Brighton, and Royston Gordon Freese, Shoreham-by-Sea, England, assignors to Ricardo & Co. Engineers (1927) Limited, London, England, a company of Great Britain
Filed Oct. 22, 1965, Ser. No. 501,836
Claims priority, application Great Britain, Oct. 26, 1964, 43,576/64
6 Claims. (Cl. 239—533)

This invention relates to fuel injection apparatus for internal combustion engines of the liquid fuel injection compression ignition type of the kind comprising fuel delivery means, usually in the form of a reciprocating fuel pump, and hereinafter referred to as the fuel pump, arranged to deliver fuel in predetermined quantities, at least one fuel injection device of the type which includes a nozzle, and a valve (hereinafter called the injection valve), controlling the flow of fuel through the nozzle and so arranged as to be opened automatically during each injection period by the fuel pressure in a pressure chamber in the injection device, usually adjacent to the injection orifice or orifices, to which chamber the fuel pump delivers the fuel.

One of the disadvantages of reciprocating internal combustion engines of the liquid fuel injection compression ignition type (and particularly those of relatively small capacity as are used in road vehicles) as compared with engines of the vaporised charge spark ignition type is that they tend to be noisy, particularly when idling and at low speeds.

Research into the cause of noisy operation has shown that a substantial proportion of the noise, including the well-known "diesel knock," appears to result from the high rate of injection inherent in existing injection systems, augmented in some cases by the fact that, at the delivery pressures employed, there is appreciable volumetric elasticity in the part of the system between the pump and the injection device which tends to delay the injection while pressure builds up in this part of the system, until the injection valve opens, whereupon injection begins at a high volumetric rate. Moreover in existing systems there is a substantial delay between the beginning of injection and the initiation of burning, and the result, which is attributed to one or both of these causes, is that, when the burning begins, there is a rapid initial pressure rise in the engine cylinder and consequent noisy operation. It has been found that if the rate of the initial pressure rise can be reduced, as by reducing the initial rate of injection and/or the delay between the beginning of injection and the beginning of burning, the noise is similarly reduced and various proposals have therefore been made which aim at reducing the rapidity of the initial pressure rise. One such proposal is the injection into the air charge prior to the main injection (e.g. during the induction or compression period) of a small quantity of fuel which is insufficient in itself to cause an appreciable pressure rise but which ignites before the main injection begins so that burning of the fuel then injected tends to start with little delay. This proposal, which is usually called "pilot injection" has not, however, been entirely successful in its purpose.

It has been found, for example, that at the injection pressures required in practice it is difficult to provide for such pilot injection in advance of the main injection, whether there is a time interval between the pilot injection and the main injection or not, due to the volumetric elasticity referred to which causes the fuel line between the pump and the pressure chamber of the injector to act to some extent as a hydraulic accumulator so that, when the injection valve opens, the initial rate of injection is too high for quiet engine operation.

Various other proposals have also been made for the purpose of reducing noise, including those incorporated in the injection systems forming the subject of the present applicants' patent application No. 17,890/62 and the present invention has for its object to provide a form of fuel injection apparatus of the general kind referred to which will represent a still further improvement over existing systems.

In fuel injection apparatus according to the present invention for an internal combustion engine of the liquid fuel injection compression ignition type and of the kind comprising a fuel pump arranged to deliver measured quantities of fuel at appropriately timed intervals to at least one fuel injection device of the type which includes a nozzle and a valve controlling the flow of fuel through the nozzle and arranged to be opened automatically during each injection period by the fuel pressure in a pressure chamber in the injection device, to which chamber the fuel pump delivers the fuel, there is included, in the delivery line for fuel between the fuel pump means and the pressure chamber, a spring pressed piston valve device arranged so that during operation of the engine at appreciable power it will be moved against the action of its spring means by the initial part of the fuel delivered by the pump through a main delivery passage during each delivery period and during such movement will deliver fuel from its delivery chamber to the said pressure chamber through a restricted delivery passage and then open a substantially unrestricted delivery passage, while during its return movement under the action of its spring it can draw fuel from the main delivery passage to replenish its delivery chamber.

In a convenient construction the delivery chamber of the piston valve device communicates with the main delivery passage through a supply passage of such restricted cross-sectional area that, while it will allow for the replenishment of fuel referred to during each of the relatively long periods between successive delivery periods, it will not permit sufficient fuel to pass through it during each of the relatively short periods representing the initial part of each delivery period to prevent adequate movement of the piston valve device to perform its joint functions of delivering fuel through the restricted delivery passage and opening the substantially unrestricted delivery passage.

The piston valve device operating in the manner set forth may conveniently be housed within the body of the fuel injection device and a fuel injection device including within it such a piston valve device together with the appropriately arranged restricted and substantially unrestricted delivery passages, and if provided, the supply passage of restricted cross-sectional area referred to is included within the scope of the present invention.

Figure 2:
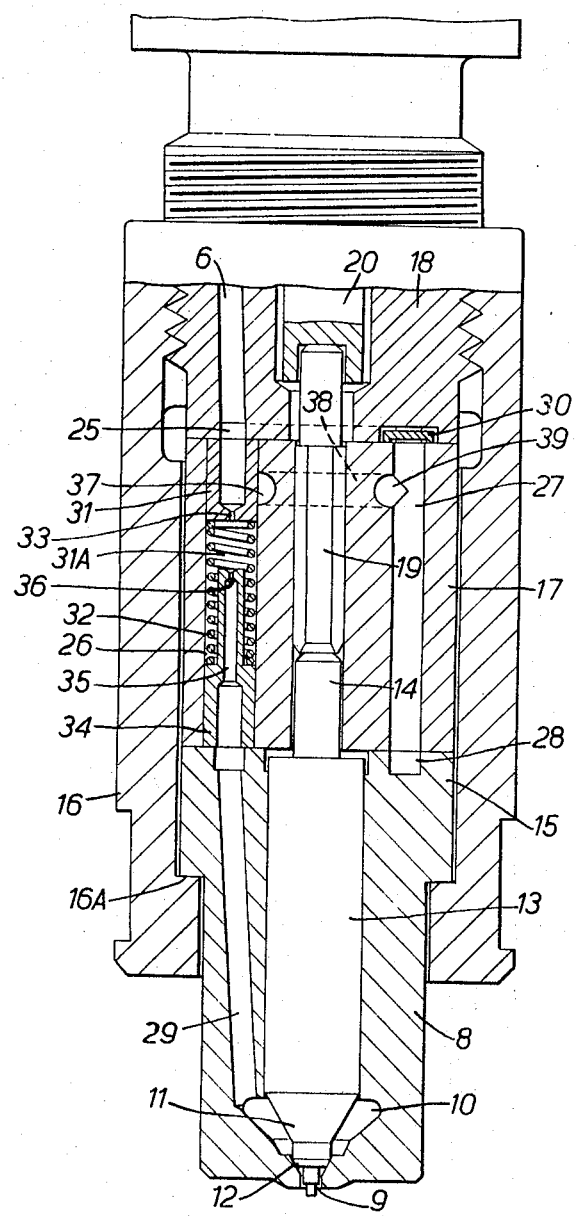

One form of fuel injection apparatus according to the invention is shown, partly diagrammatically, by way of example in the accompanying drawings in which FIGURE 1 is a side elevation mainly in section showing the complete system including a fuel pump, a fuel delivery line and fuel injection device, and FIGURE 2 is a cross section on an enlarged scale through the lower portion of the fuel injection device in which is housed the piston valve device.

In the general system shown in FIGURE 1 the apparatus comprises a fuel pump 1 of the conventional reciprocating piston type arranged to deliver fuel at the appropriately timed intervals to a main delivery passage 2, the pump being provided with a control device, indicated at 3, of known type by which the quantity of fuel delivered during each delivery period can be varied.

The main fuel delivery passage 2 is connected by means of a coupling 4 to a fuel injection device comprising a body part 5 in which is formed a passage 6 constituting a continuation of the main delivery passage 2 and by which fuel is delivered to a nozzle assembly generally indicated at 7 in FIGURE 1 and shown in cross-section in FIGURE 2.

The nozzle assembly comprises a nozzle member 8 having formed therein a main injection orifice 9 opening out of a pressure chamber 10 in which lies the lower end of a valve member 11 having a valve part 12 which when the valve member 11 is in its closed position engages a seating so as to close the orifice 9. The stem part 13 of the valve member 11 slides with a close sliding fit within a bore in the nozzle member 8 and is provided with a projection 14.

The upper part 15 of the nozzle member 8 lies within the body part 16 of the injection device and has an upper face which makes a close sealing fit with the lower face of an externally cylindrical plug-like member 17 the upper face of which is engaged in a fluid tight manner by the lower face of an externally screwthreaded clamping member 18 screwed within the body part 16 so as to clamp between it and an internal thrust face 16A on the body part 16, the member 17 and the upper part 15 of the nozzle member 8.

The pluglike member 17 has a central bore into which projects the projection 14 in the stem part 13 of the valve member 11 and in which lies and can slide the lower portion of a push rod 19 the upper end of which is acted upon by the lower end of a rod 20. The upper end of the rod 20 carries a thrust collar 21 as shown in FIGURE 1 on which acts the lower end of a compression spring 22 the upper end of which bears against a thrust member 23 which in turn is acted upon by an adjustable thrust screw 24. Thus the valve member 11 is continuously urged downwards by the spring 22 but can be moved upwardly against the action of this spring so that the valve part 12 bears against its seating if and when fuel at sufficient pressure is delivered to the pressure chamber 10.

For the delivery of such fuel from the main delivery passage 2, 6 to the pressure chamber 10 there is provided in the lower face of the clamping member 18 an annular recess 25 in direct communication with the lower end of the delivery passage 6 and this annular recess 25 communicates with the upper ends of two bores 26 and 27, in the member 17, the lower ends of which bores communicate via an annulus 28 with passage 29 opening into the pressure chamber 10. The upper end of the bore 27 is controlled by a disc valve 30 which serves to prevent entry of fuel into the bore 27 from the annular recess 25 but permits flow of fuel from the bore 27 into the annular recess 25 for the purpose of relieving pressure within the pressure chamber 10 at the termination of each injection period, in a manner known per se.

Disposed within the bore 26 is a piston valve device 31 which is acted upon by a compression spring 32, is capable of sliding with a close sealing tight fit within the bore 26 and itself has a bore which includes a passage 33 of restricted cross sectional area. Fixed within the bore 26 below the piston valve device 31 is a member 34 containing an internal passage 35 which communicates through a restricted passage 36 with the upper end of the passage 29 via the annulus 28. The compression spring 32 interposed between a shoulder on the part 34 and the lower end of the piston valve device 31 acts so as normally to urge this device towards an upper position in which its upper end abuts against the lower face of the clamping member 18 while the downward movement of the piston valve device 31 is limited by engagement with the upper end of the part 34.

Opening out of the bore 26 at a point where it will be covered by the piston valve device 31 when the latter is in its uppermost position but will be uncovered by this device at a point in its downward movement is a port 37 communicating with an annular passage 38 which in turn communicates through a port 39 with the bore 27.

The port 37, passage 38, port 39, annulus 28 and passage 29 together constitute the substantially unrestricted delivery passage referred to, when the piston valve device 31 uncovers the port 37 while the restricted passage 36 and passage 29 constitute the restricted delivery passage referred to.

The operation of the apparatus is as follows. Assuming delivery by the pump 1 during each delivery period of a substantial quantity of fuel equivalent to operation of the engine under normal power conditions the piston valve device 31 will, before each delivery period occupy a position in which its upper end bears against the lower face of the clamping member 18 and the initial part of the fuel delivered will therefore force the piston valve device 31 downwards against the action of the spring 32. The cross sectional area of the passage 33 is so small in relation to the speed of downward movement of the piston valve device 31 at this time that the device will act as a piston to deliver from its delivery chamber 31A through the restricted delivery passage 36, and passage 29 an initial quantity of fuel prior to the uncovering of the port 37. After the port 37 has thus been uncovered it will be seen that fuel delivery can take place in substantially unrestricted manner through the port 37, the annular passage 38, the port 39, the bore 27, annulus 28 and the passage 29 to the pressure chamber 10. As will be seen the downward movement of the piston valve device 31 will be stopped by its engagement with the part 34 and, when the delivery period has terminated, the spring 32 will force the piston valve device 31 upwards while flow of fuel will take place through the restricted passage 33 into the delivery chamber below the piston valve 31 so as to replenish this chamber.

The dimensions of the passage 33 and the characteristics of the spring 32 are such that whereas, as mentioned, during the short initial fuel delivery period the speed of downward movement of the piston valve device 32 will be such that it acts as a piston to deliver an initial quantity of fuel from its delivery chamber 31A to the pressure chamber 10 in the manner referred to, the comparatively long period between successive fuel delivery periods will be sufficient to enable the piston valve device 31 to move upwards into engagement with the lower face of the clamping member 18 and thus replenish the delivery chamber 31A from the main delivery passage 2, 6 before the next delivery period.

What we claim as our invention and desire to secure by Letters Patent is:

1. Fuel injection apparatus for an internal combustion engine of the liquid fuel injection compression ignition type, comprising a fuel injection device including a nozzle having at least one injection orifice, a valve which controls the flow of fuel through the nozzle and is arranged to be opened by fuel pressure in a pressure chamber in the injection device, and first spring means urging the valve towards its closed position, fuel delivery means arranged to deliver measured quantities of fuel at appropriately timed intervals, a main delivery passage to which said delivery means delivers said fuel, restricted and substantially unrestricted delivery passages for fuel flow from said main delivery passage to said pressure chamber, a valve chamber one end of which communicates with said main delivery passage while its other end constitutes a delivery chamber communicating with said pressure chamber through said restricted delivery passage, a piston valve device reciprocable in said valve chamber, and second spring means urging said piston valve device against the fuel pressure in said main delivery passage, said valve chamber being provided with a port which communicates with said substantially unrestricted delivery passage and is disposed so as to be closed by said piston valve device when said piston valve device occupies a position corresponding to low pressure in the main delivery passage whereas, when said piston valve device is moved against the action of said spring means by delivery of fuel by said delivery means, it first acts as a piston delivering fuel from said delivery chamber to said pressure chamber through said restricted delivery passage and then acts as a valve to open said port to permit fuel from said main delivery passage through said substantially unrestricted delivery passage to said pressure chamber, a replenishment passage being provided by which, during the return movement of the piston valve device under the action of the spring means fuel is drawn into its delivery chamber from said main delivery passage.

2. Fuel injection apparatus as claimed in claim 1 in which said delivery chamber communicates with the main delivery passage through a replenishment passage of restricted cross-sectional area which allows for the replenishment of the delivery chamber during the relatively long periods between successive delivery periods of said fuel delivery means but does not permit sufficient fuel to pass through it during each of the relatively short periods representing the initial part of each delivery period of said fuel delivery means to prevent movement of the piston valve device to perform its joint function of delivering fuel through said restricted delivery passage and then opening said port to permit fuel flow through said substantially unrestricted delivery passage.

3. Fuel injection apparatus as claimed in claim 2 in which said restricted and substantially unrestricted delivery passages and said piston valve device are disposed within the injection device.

4. Fuel injection apparatus as claimed in claim 1 in which said restricted and substantially unrestricted delivery passages and said piston valve device are disposed within the injection device.

5. A fuel injection device for an internal combustion engine of the liquid fuel injection compression ignition type, including a nozzle, a valve arranged to control the flow of fuel through the nozzle and to be opened automatically by the fuel pressure in a pressure chamber in the injection device, wherein the injection device includes restricted and relatively unrestricted delivery passages extending between a main fuel delivery passage and the said pressure chamber, the restricted delivery passage having associated with it a piston valve device acted upon by a spring means and arranged to be moved against the action of such spring means by fuel delivered to the main delivery passage so that when such fuel is delivered at an appropriate volumetric rate and in sufficient quantity, such piston valve device will be moved so as first to act as a piston delivering fuel from its delivery chamber through the said restricted delivery passage and then as a valve to open the substantially unrestricted delivery passage while, during the returning movement of the piston valve device under the action of its spring it can draw fuel into its delivery chamber from the main fuel delivery passage.

6. A fuel injection device as claimed in claim 5 in which the delivery chamber of the piston valve device communicates with the main fuel delivery passage through a supply passage of such restricted cross-sectional area that while it will allow for the replenishment of said delivery chamber during the relatively long periods between successive deliveries of fuel to the injection device, it will not permit sufficient fuel to pass through it during the relatively short periods representing the initial part of each fuel delivery to prevent adequate movement of the piston valve device to perform the joint function of delivering fuel through the restricted delivery passage and opening the substantially unrestricted delivery passage.

References Cited

UNITED STATES PATENTS 2,173,814    9/1939    Bischof _____ 239—533 X
3,104,817    9/1963    Vander Zee et al. __ 239—533 X M. HENSON WOOD, JR., *Primary Examiner.*

V. M. WIGMAN, *Assistant Examiner.*